United States Patent [19]

Caya

[11] Patent Number: 5,003,650
[45] Date of Patent: Apr. 2, 1991

[54] BUNK BED WITH LADDER

[76] Inventor: Mario Caya, R.R. #1, Pakenham, Ontario, Canada, K0A 2X0

[21] Appl. No.: 520,508

[22] Filed: May 8, 1990

[30] Foreign Application Priority Data

Aug. 29, 1989 [CA] Canada .................................. 609758

[51] Int. Cl.⁵ ........................ A47C 19/00; A47D 7/00
[52] U.S. Cl. ............................................ 5/9.1; 5/507; 182/206
[58] Field of Search ........................ 5/9.1, 8, 507, 508; 282/206

[56] References Cited

U.S. PATENT DOCUMENTS

| 852,726 | 5/1907 | Kroenke . | |
|---|---|---|---|
| 1,156,833 | 10/1915 | Bonhard . | |
| 2,839,265 | 6/1958 | Cogley | 5/507 |
| 3,008,534 | 11/1961 | Von Canon | 5/9.1 |
| 3,557,906 | 1/1971 | Gutner | 182/206 |
| 3,633,224 | 1/1972 | Miller | 5/18 |
| 4,146,940 | 4/1979 | Fredman et al. | 5/9.1 |
| 4,193,146 | 3/1980 | Fredman et al. | 5/8 |
| 4,196,484 | 4/1980 | Harris | 5/201 |
| 4,592,101 | 6/1986 | Page | 5/9 R |
| 4,674,141 | 6/1987 | Hyatt et al. | 5/132 |

FOREIGN PATENT DOCUMENTS

| 168972 | 4/1916 | Canada . |
|---|---|---|
| 188269 | 1/1919 | Canada . |
| 1096103 | 2/1981 | Canada . |
| 1122752 | 5/1982 | Canada . |

Primary Examiner—Alexander Grosz
Attorney, Agent, or Firm—Eckert Seamans Cherin & Mellott

[57] ABSTRACT

Improvements are provided in a bunk bed which includes a head board having a pair of spaced-apart legs and upper and lower transverse frames, a tail board having a pair of spaced-apart legs and upper and lower transverse frames and connecting members comprising a pair of transversely-spaced-apart upper and lower longitudinally-extending frames. A first improvement is in the form of an assembly bracket comprising an apertured side plate, an apertured face plate securely-connected thereto, and a perpendicularly-extending ledge extending along the length of the side plate. That ledge also extends from a face of the face plate and is securely-connected both to an intermediate region of the side plate and to an intermediate region of the face plate. A second improvement is in the form of a bunk bed ladder comprising a pair of spaced-apart, upright stiles with a plurality of steps or rungs therebetween, an upper longitudinally-extending protective rail secured to the inner face of each of the stiles, a lower longitudinally-extending protective rail secured to the inner face of each of the stiles, and a pair of vertically-spaced-apart brackets secured to the inner face of each of the stiles. The brackets each include an upper portion fixedly-secured to an associated stile, and a lower portion spaced from its associated stile and adapted to be firmly secured to a longitudinal frame member of the bunk bed.

4 Claims, 4 Drawing Sheets

— 5,003,650 —

BUNK BED WITH LADDER

BACKGROUND OF THE INVENTION (i) Field of the Invention

The present invention generally relates to bunk beds. The present invention also relates to an improved design for a very sturdy but yet simple to assemble bunk bed of normal size, or of double size, of queen size, of king size, or of any combination of sizes.

In one particular embodiment, it relates to an improved bunk bed ladder which is supported from the bunk bed assembly in an economical and safe manner. In another particular embodiment, it relates to novel brackets for such bunk bed. In yet another particular embodiment, it relates to a novel construction for supporting the mattresses of such bunk bed.

(ii) Description of the Prior Art

Bunk bed ladders are now supported from the bed rail of the upper bed of a bunk bed assembly by hooks which merely hook over the upper edge of the upper bed rail. In some instances, each hook is provided with an inwardly offset lower end portion which tends to retain the hook aligned with the bed frame rail even though the ladder may be lifted upwardly. However, there have been many accidents caused by bunk bed ladders being inadvertently lifted off the bed rail or by bunk bed ladders shifting along the bed rail while a child is climbing onto the upper bunk.

Another problem which has existed is that when a ladder is suspended solely from the top edge of the bed rail of the upper bunk bed by using conventional hooks and a person climbs up or down the ladder, the weight and pull of the person climbing the ladder introduces a tremendous strain on the bed rail, the ladder and the legs or posts of the bunk bed. This, while presently available hooks are relatively simple and inexpensive, they introduce the possibility of injury and a feeling of insecurity due to the looseness of the connection between the ladder and bunk bed.

In U.S. Pat. No. 4,193,146, patented Mar. 18, 1980, by H. Friedman et al, a bracket was provided for mounting a bunk bed ladder from the bed rail of an upper bunk bed. The bracket engaged both the top and inner bottom edges of the bed rail, which was said to prevent the bunk bed ladder from being accidentally lifted off and disengaged from the bed rail, and to prevent the ladder from shifting along the bed rail, and to reduce twisting of the rail and strain on the post or leg of the bunk bed, thereby reducing failure of bed rails, bed posts, and the ladders, and to prevent the ladder from tilting outward while climbing. The bracket means included a separate bracket structure mounted on each side of the ladder. The bracket means which engaged the upper edge of the bed rail included a terminal end of a bracket strap which overlay the top edge and engaged the inner surface of a vertical flange of a right angled bed rail. The bracket which engaged the bottom edge of the bed rail included a strap having a hook-shaped end, which engaged the inner edge of the horizontal flange of the bed rail and an opposite end connected with the side of the ladder to prevent vertical movement between the ladder and rail and to prevent relative twisting between the ladder and rail. The strap which engaged with the vertical flange of the rail extended to a point below the rail, with the strap which engaged the lower flange of the rail being secured to the lower portion of the vertical strap. The vertical strap included two offset portions which were disposed at different vertical levels for engaging the bottom flange of two different size bed rails. The offset portions has fastener receiving means thereon at two laterally-spaced positions to enable the horizontal strap to engage with two different size bed rails.

The art also attempted to provide improvements in rail supports or corner brackets for bedsteads.

In Canadian Patent No. 168,972, patented Apr. 18, 1916, by C. F. Streit, a corner bracket formed from a single sheet metal blank was provided for bedsteads. The corner bracket included a supporting flange, side walls extending therefrom, a rail-supporting table plate extending horizontally from one side wall and forming therewith a right angled side rail support, a vertical extension connected to the opposite side wall and a horizontal reenforcing shelf connected to the opposite side wall extension and extending beneath the free end of the table plate, the extension and the free end of the table plate forming a right-angled cross rail support.

Canadian Patent No. 188,269, patented Jan. 14, 1919, by J. Silverstein, provided means for rigidly securing superimposed structures together. The patentee provided superimposable beds, the legs of which were either being provided at each end with an opposite part of complementary locking means or being provided at their lower ends with one complementary part of locking means and at their upper ends with the other complementary part of locking means, whereby one bed could be positioned over the other through registration of the complementary parts of the locking means. Bars or posts, advantageously of angle-iron construction were arranged to be securely locked together through the provision of locking means on one complementary part and lock-engaging means on the other complementary part. The locking means and the lock-engaging means advantageously included, when the posts were of angle-iron construction, a slot in one face or side of one angle-iron and a projecting lug on one face of another angle-iron, the lug being adapted to register with the slot and the faces of the angle-irons being arranged to fit flush against each other. Rests or supports were provided on the interior faces of the angle-irons to assist in aligning the parts and rigidly holding them in aligned position.

U.S. Pat. No. 852,726, patented May 7, 1907, by A. J. Kroenke, provided a cast metal corner lock for bedsteads, having wings at right angles and a middle transversely-rounded portion for the bed post uniting the wings, and a face plate covering the lock conforming to the entire surface and edges thereof and having upward and downward projections at its middle segmental in cross-section and projecting beyond the edges of the lock, to provide a finished facing for the outer side of the lock.

U.S. Pat. No. 1,156,833, patented Oct. 12, 1915, by A. M. Bonhard, provided a device for securing the side rails of a bed to the end members of the bed and at the same time provided means for supporting a mattress on the bed. The patentee provided the combination of an end-plate adapted to be mounted on the side post of the end of a bed, and a rail-plate adapted to be secured at one end of a side rail of a bed on the inner face of the end plate. The end-plate was provided with a series of openings to receive screws for securing the end-plate to the post and also with a plurality of screw-threaded openings and which had a recess in one end thereof.

The rail-plate had a series of openings through which screws could be passed for securing the rail-plate to the rail, the rail-plate being provided at its upper end with a horizontally-arranged flange and along one edge with a vertically-arranged flange. The vertically-arranged flange was provided on its outer surface with a lug adapted to enter the recess in the end-plate. It also has a series of openings which registered with the screw-threaded openings in the end-plate. Screws passed through the openings in the flange and into the screw-threaded openings in the end-plate.

U.S. Pat. No. 4,674,141, patented Jun. 23, 1987, by M. Hyatt, provided brackets for connecting head and foot-boards to bed side rails. While beds historically have been constructed in varied sturdy configurations, there was a tendency for the connections between head-boards and footboards with the associated side rails to loosen, particularly when the beds continued to be used over a long period of time. The bed user's tossing and turning had a tendency to loosen the connections between these components, even though, in many instances several bolts or other latching devices were used to strengthen them. The patented bracket was for attaching a side rail to a headboard and a footboard, the side rail having screw-receiving cavities. The bracket included an L-shaped body portion having a side section and an end section, each of these sections having an inner and outer surface. Means releasably secured the inner surface of the side section to the side rail. Threaded means within said body portion end section cooperatively aligned with the side rail cavities. Screw means extended through at least the headboard and threadably engaged the end section threaded means to hold at least the headboard securely against the body portion end section inner surface and the side section inner surface.

SUMMARY OF THE INVENTION (i) Aims of the Invention

An object of this invention is to provide a novel construction of a bunk bed of various sizes or combination of sizes which is simple to manufacture and has a sturdy, long and reliable life.

Another object of the present invention is to provide a bunk bed including a ladder, and the ladder itself which, when secured to the bed rails of the bunk bed will not be able to be accidentally lifted off the bed rail and which is kept from shifting longitudinally along the bed rail.

Yet another object of this invention is to provide a bracket for such bunk bed ladder, such bracket serving to prevent twisting or torquing of the bed rail by forces exerted thereon when climbing the ladder, which also reduces the strain on the leg or post of the bed which results from forces exerted by the ladder to the rail and reduces twisting of the rail which further results in less failure of the rails and bed legs or posts.

A further object of this invention is to provide a bracket structure for mounting a ladder on a bunk bed assembly, which bracket serves to prevent the ladder from tilting outward when climbing and which reduces ladder failure due to forces exerted thereon when climbing the ladder.

Yet another object of this invention is to provide a corner bracket for a bunk bed, the corner bracket serving to unite transverse frames, longitudinal frames and upright legs of the bunk bed together.

A further object of this invention is to provide a device for securing the side rails of a bed to the end members of the bed and at the same time to provide means for supporting a mattress on the bed, the support being very strong, and being easily applied.

Still another object of the present invention is to provide an improved bracket for connecting head-boards and footboards to side rails that may be manufactured at a reasonable cost and utilized to provide a bed that will have a sturdy, long and reliable life.

(ii) Statement of Invention

This invention provides an improvement in a bunk bed including a head board having a pair of spaced-apart legs and upper and lower transverse frames, a tail board having a pair of spaced-apart legs and upper and lower transverse frames and connecting members comprising a pair of transversely spaced-apart upper and lower longitudinally-extending frames. In one broad embodiment of this invention, the improvement comprises: an assembly bracket including an apertured side plate, an apertured face plate securely-connected thereto, and a perpendicularly-extending ledge extending along the length of the side plate and extending from a face of the face plate and being securely-connected to an intermediate region of the side plate and the face plate. Such perpendicularly-extending ledge preferably extends along the longitudinal length of the bunk bed.

This invention also provides an improvement in a bunk bed ladder, such improvement in the bunk bed ladder comprising: a pair of spaced-apart, upright stiles with a plurality of steps or rungs therebetween, an upper, longitudinally-extending protective rail secured to the inner face of each of the stiles, a lower, longitudinally-extending protective rail secured to the inner face of each of the stiles, and a pair of vertically-spaced-apart brackets secured to the inner face of each of the stiles, the brackets each including an upper portion fixedly-secured to an associated stile, and a lower portion spaced from its associated stile and adapted to be firmly-secured to a longitudinal frame member of the bunk bed.

This invention also provides an improvement which comprises: both an assembly bracket including an apertured side plate, an apertured face plate securely-connected thereto, and a perpendicularly-extending ledge extending along the length of the side plate and extending from a face of the face plate and being securely-connected to an intermediate region of the side plate and to an intermediate region of the face plate, and a bunk bed ladder comprising a pair of spaced-apart upright stiles with a plurality of steps or rungs therebetween, an upper longitudinally-extending protective rail secured to the inner face of each of the stiles, a lower longitudinally-extending protective rail secured to the inner face of each of the stiles, and a pair of vertically-spaced-apart brackets secured to the inner face of each of the stiles, the brackets each including an upper portion fixedly-secured to an associated stile, and a lower portion spaced from its associated stile and adapted to be firmly-secured to a longitudinally frame member of the bunk bed.

(iii) Other Features of the Invention

In one feature of this first embodiment of the invention there may be eight similar such assembly brackets, each bracket having its sides plate secured to a corresponding longitudinal frame, and its face plate secured to a corresponding vertical leg. The perpendicularly-extending ledge to two mutually-facing brackets extend towards, and meet, each other, to provide an interior metal rail for the bunk bed. There may also be an interior transverse frame member, or transverse frame members, fixedly-securing corresponding interior longitudinal frames, adding rigidity and stability to frames and headboards, making these more resistant to outward or inward forces exerted on the bed. The bunk bed may also include a plurality of interior transverse joists extending across associated pairs of spaced-apart, perpendicularly-extending ledges of the assembly brackets.

In another feature of this first embodiment of the invention, the longitudinally-extending interior frame pieces may each be provided as a plurality of sub-pieces, e.g., three sub-pieces, with a pair of vertical slots in the mid-frame piece or the mid-frame pieces between the end pieces. Thus the interior longitudinal frame may be provided as three sub-pieces, but may have more or less sub-pieces, depending on the mattress support material. Such improvement may also include a plurality of interior intermediate transversely-extending frame members extending between the outer frames and connected, at their ends, to the joists between outer the sub-pieces and the mid sub-pieces. In addition, such improvement may also include a plurality of mattress-support sub-platforms.

In one feature of this second embodiment of the invention lower longitudinal frame member may include a plurality of longitudinally-extending frame pieces resting on an associated perpendicularly-extending ledge, and a plurality of transverse joists extending across associated pairs of spaced-apart, perpendicularly-extending ledges, the joist longitudinally-extending frame pieces each provided as a plurality, e.g. three sub-pieces, with a pair of vertical slots in the mid-frame piece or pieces between the end pieces, at least an intermediate sub-piece including spaced-apart vertical slots, within which the lower portion of each bracket is adapted to mate. The sub-pieces on either side of the intermediate sub-piece also each include a vertical slot so that the lower portion of each bracket may mate in slots to one side or the other of the intermediate sub-piece.

In another feature of this second embodiment of the invention, the upper, longitudinally-extending protective rail and the lower, longitudinally-extending protective rail may each be secured to an associated stile by means of at least one bolt passing into the stile. Such bolt may also, but not necessarily, secure the upper end of an associated bracket to the stile.

In still another feature of this second embodiment of the invention, the bunk bed includes a pair of interior, longitudinally-extending rails, and a pair of outer, longitudinally-extending wooden frames. The outer longitudinally-extending wooden frames are secured to respective brackets at respective legs. In addition, the mid-portion of each outer wooden frame is secured by bolts to the mid-portions of an associated inner rail. By these means, the wooden frame not only adds beauty to the bunk bed, but also adds rigidity to the metal rail, thus preventing downward curving under pressure. In addition, the metal rail prevent the wooden frame from warping. The location of these bolts is such that one bolt is associated with an associated one of the previously-mentioned vertical slot within which the lower portion of each bracket is adapted to mate. Each stile is provided, at the region of the lower end of each bracket, with a striker plate secured to an associated stile by means of a bolt. The bolt head and the striker plate act as a bumper pad between the ladder stile and the wooden frame, therefore preventing one from marking the other.

Figure 1:
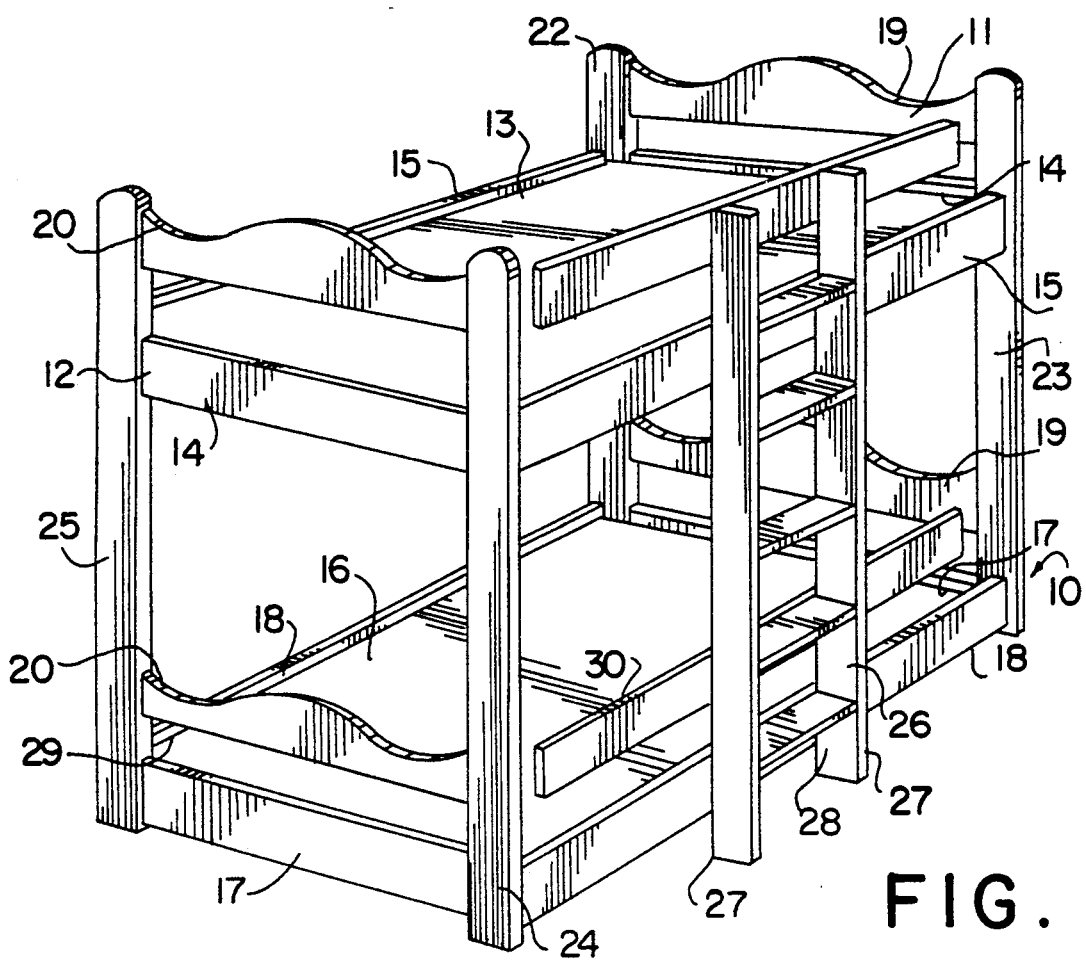
FIG. 1 is a perspective view of a bunk bed of one embodiment of the present invention, also showing the ladder of another embodiment of this invention.
Figure 2:
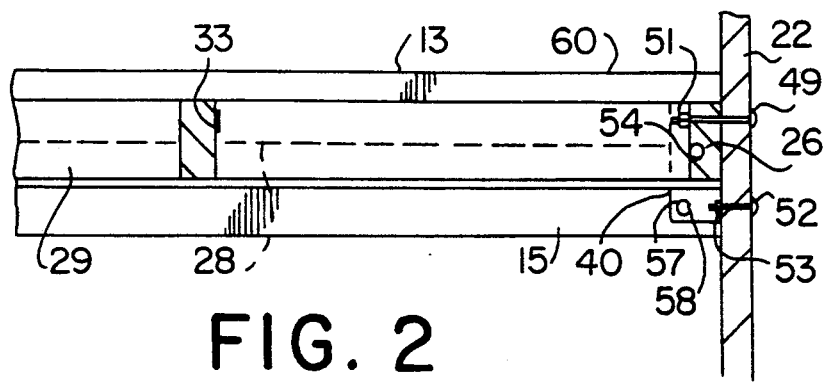
FIG. 2 is a partial transverse section view through an upper or a lower bunk of the bunk bed of FIG. 1.
Figure 3:
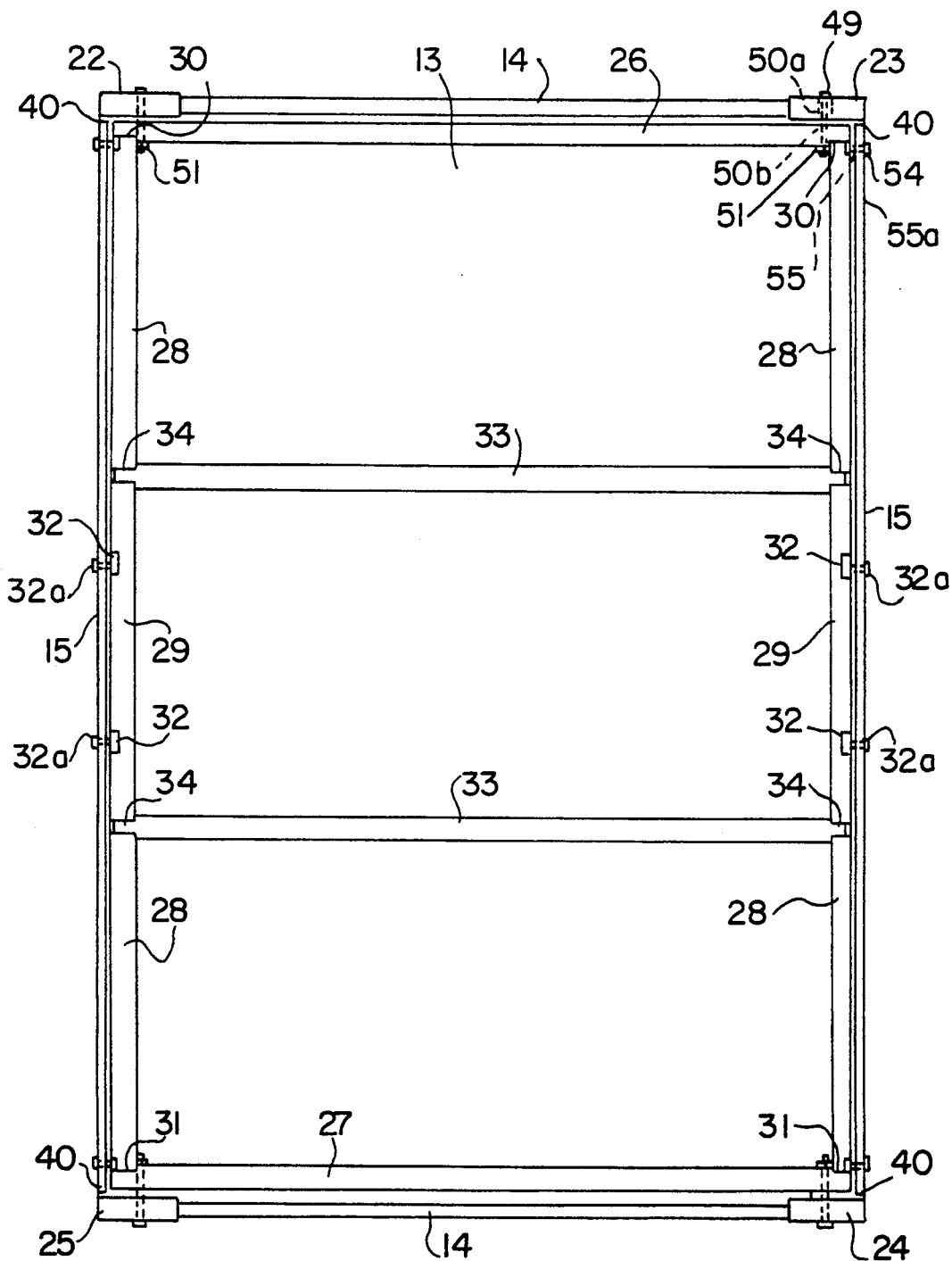
FIG. 3 is a top plan view of a mattress support framework for an upper or a lower bunk of the bunk bed of FIG. 1.

DESCRIPTION OF PREFERRED EMBODIMENTS (i) Description of FIGS. 1, 2 and 3

As seen in FIGS. 1, 2 and 3, the bunk bed 10 of one embodiment of this invention includes a head board 11 and a tail board 12. An upper bunk 13 is defined by upper transverse head and tail frames 14 and upper longitudinal frames 15. A lower bunk 16 is defined by lower transverse head and tail frames 17 and lower longitudinal frames 18. The head board is provided with upper and lower decorative head board cross pieces 19 and with upper and lower tail board cross pieces 20. The head board 11 and the tail board 12 are assembled to legs 22, 23, 24 and 25 by means of a corner bracket to be described later with respect to FIGS. 4 and 5.

FIG. 3 shows the mattress-support framework of the upper bunk 13 (it being understood that the lower bunk 16 is of similar construction). Leg 23 (for example) is secured to transverse frame member 26 and to longitudinal frame 15 by means of the corner bracket to be described later with respect to FIGS. 4 and 5. Longitudinal frame 15, is comprised of an outer frame portion, having a generally rectangular cross section, and an inner frame section comprised of longitudinal frame sub-pieces 28 and 29, as best seen in FIG. 6. Legs 22, 24 and 25 are similarly secured both to respective transverse frame members 26 or 27 and to respective longitudinal frame 15 by means of a corner bracket to be described later with respect to FIGS. 4 and 5.

As noted above, legs 22, 23, 24 and 25 are secured to longitudinal frame 15 by means of an associated corner bracket to be described later with respect to FIGS. 4 and 5. Similarly, legs 22, 23, 24 and 25 are secured to transverse frame 14 by means of an associated corner bracket to be described later with respect to FIGS. 4 and 5.

FIG. 3 also shows that leg 22 is to be interconnected to leg 23 (not seen) by decorative transverse cross-piece 19. Similarly, (although not shown) legs 25 and 24 are to be interconnected by decorative transverse cross-piece 20.

An inner mattress framework is provided by means of a plurality of end longitudinal frame sub-pieces 28, and one or more mid, longitudinal frame sub-pieces 29, which rest on the bracket to be described later with respect to FIGS. 4 and 5. It is noted that four end frame sub-pieces 28 are each adapted to be urged into an associated mortise 30 at an associated end of transverse head frame member 26, while the other four end frame sub-pieces 28 are each adaped to be urged into an associated mortise 31 at an associated end of transverse tail frame member 27. Mid sub-pieces 29 are provided with two spaced-apart, outwardly-facing slots 32 therein whose purpose will be described hereinafter. It is also possible to have an additional mid-sub-piece (not shown) between mid-sub-piece 29 and end-sub-piece, with a slot therein (not shown) similar to slots 32, and whose purpose will also be described hereinafter. In addition, at the region of slots 32, inner longitudinal metal frame 48 is secured to outer longitudinal wooden frme 15 by means of bolts 32a, whose additional purpose will be described hereinafter. Auxiliary transverse frame pieces 33 are each provided at each end with a tenon 34 which is adapted to be urged against the associated end of central sub-pieces 29.

Figure 4:
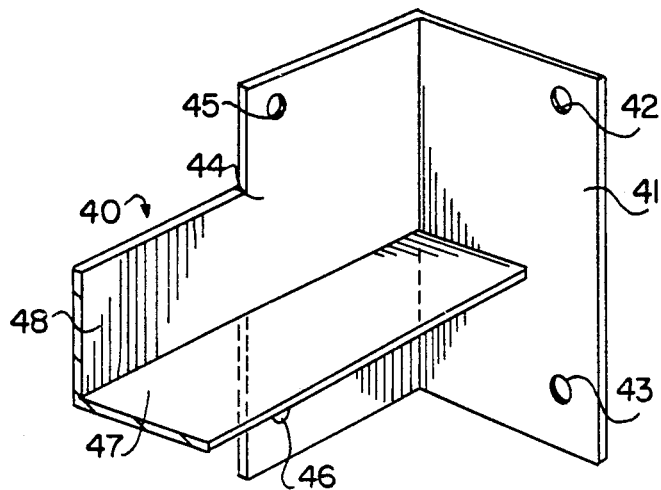
FIG. 4 is a perspective view of the bracket of an embodiment of the invention.

(ii) Description of FIG. 4

FIG. 4 shows one of the eight brackets 40, which are used to assemble the bunk bed 10 of one embodiment of this invention. Bracket 40 includes a face plate 41 provided with upper aperture 42 and lower aperture 43, and, at right angles thereto, side plate 44, also provided with upper aperture 45 and lower aperture 46. Securely-associated with face plate 41 and side plate 44 is an inwardly-extending perpendicular ledge 47. An extension plate 48 is integrally-associated with side plate 44, and ledge 47 is also securely-associated with extension plate 48. Ledge 47, side plate 44 and extension plate 48 together provide an "L"-shaped angle support.

Figure 5:
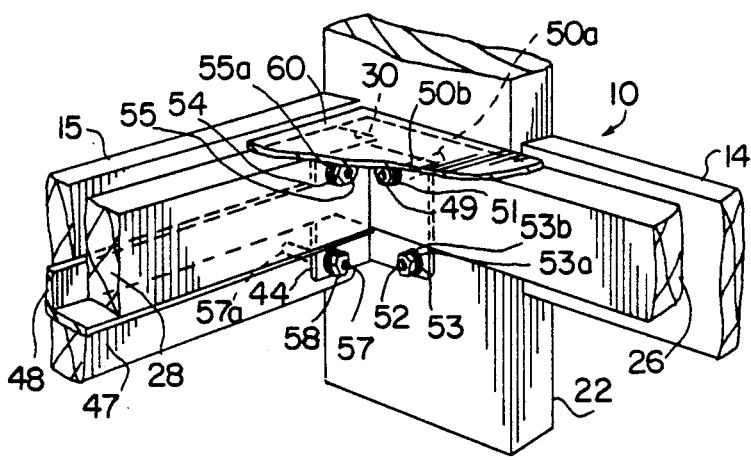
FIG. 5 is a perspective view of the lower corner of the headboard of the bunk bed of one embodiment of the present invention, showing the bracket of another embodiment of the present invention, it being realized that there are seven other similar corner constructions.
Figure 6:
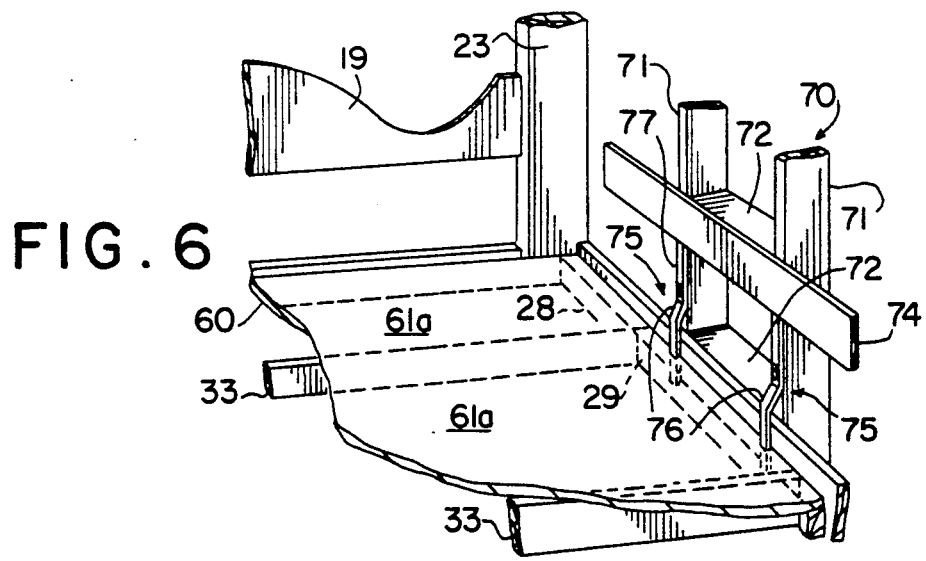
FIG. 6 is a perspective view of the lower platform of the bunk bed of one embodiment of the present invention, showing the lower ladder bracket of the ladder of another embodiment of this invention, and the platform frame of the bunk bed of one embodiment of this invention.

(iii) Description of FIG. 5

FIG. 5 shows the construction details of the bunk bed 10 of one embodiment of this invention by means of the assembly bracket 40 of another embodiment of this invention. The bracket 40 is assembled to a leg, e.g., leg 22 by means of long upper bolt 49 passing through aligned apertures 50a in leg 22, 42 in face plate 41, and 50b in transverse frame sub-piece 26, the bolt 49 being secured by nut 51. Short lower bolt 52 secures bracket 40 to leg 22 by passing through aligned apertures 53a in leg 22 and 43 in face plate 41, the short lower bolt 52 being secured by nut 53. Transverse frame 14 is secured to leg 22 by means of a mortise joint. Longitudinal frame 15 is secured to side plate 44 by means of short lower bolt 57 which also passes through aligned aperture 57a in longitudinal frame 15 and aligned aperture 46, bolt 57 being secured by nut 58. Longitudinal frame 15 is also secured to side plate 44 by means of short upper bolt 54, which passes through aligned apertures 45 in side plate 44 and 55a in longitudinal frame 15.

Bracket 40 also provides, by means of side wall extension 48, the inner longitudinal metal frame and, by means of ledge 47, a support for the inner wooden sub-pieces 28, 29.

FIG. 5 shows, in somewhat more detail, how longitudinal frame sub-piece 28 rests with its lower face on ledge 47, with its exterior side face abutting side plate 44, and also abutting extension plate 48. Its end portion abuts mortise 30 in transverse frame member 26. It also shows how transverse member 26 rests with its lower face on the lateral end of ledge 47, with its side face abutting face plate 41, and with the mortise 30 against the end of longitudinal sub-piece 28.

FIG. 5, as well as FIG. 2, also show the mattress-support 60 resting on transverse frame members 26 and 27 and on longitudinal frame sub-pieces 28 and 29 as well as on internal transverse frames 33.

Figure 7:
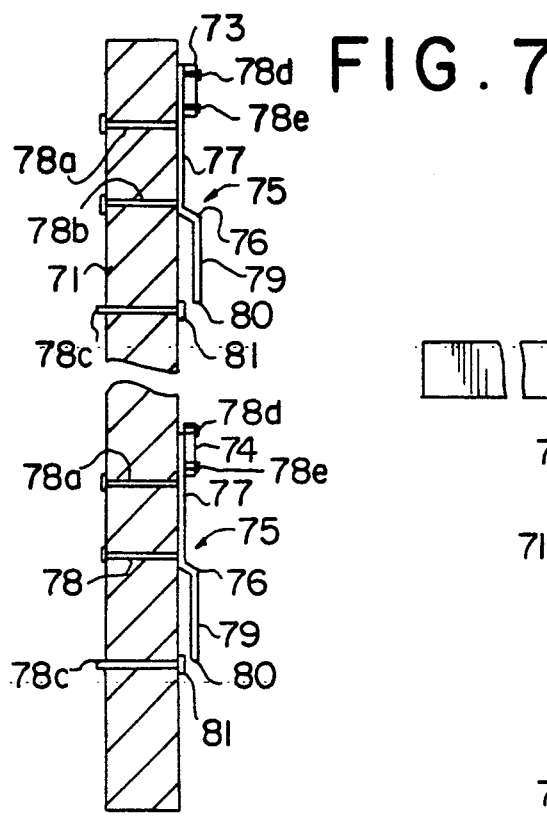
FIG. 7 is a side elevational view of the laddder of the embodiment of the invention shown in FIG. 1.
Figure 8:
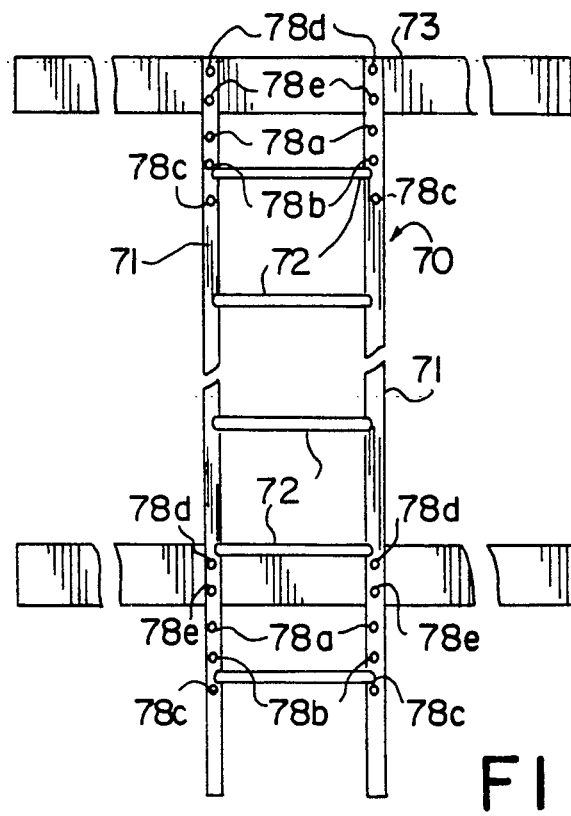
FIG. 8 is a front elevational view of the ladder of the embodiment of the invention shown in FIG. 1.

(iv) Description of FIGS. 6, 7 and 8

As seen in FIG. 6, 7 and 8, the bunk bed ladder 70 of a second embodiment of this invention includes a pair of spaced-apart vertical stiles 71 with a plurality of vertically-spaced-apart steps or rungs 72 therebetween, as well as an upper longitudinally-extending protective rail 73 and a lower longitudinally-extending protective rail 74.

The ladder 70 is provided with two pairs of upper and lower identical brackets 75, each being in the form of bent metal bars 76, including an upper portion 77 firmly secured to an associated stile 71 e.g., from the rear by upper bolts or wood screws 78a and 78b and a lower portion 79 spaced inwardly from the stile 71 and adapted to enter a vertical slot 32 previously described. If the lower portion 79 enters the slots 32, the ladder is centrally situated as shown in the drawing. If the lower portion 79 enters an off-center slot (not shown) the ladder is situated on either side of the center. In such case, the protective rail is shorter than as shown in the drawing to allow a seating arrangement at one end of the bunk bed. Thus the ladder may be provided with various lengths of protective rails. At approximately the level of the lower end 80 of each bar 75 within the stile 71 is a striker plate 81 secured to stile 71 by lower bolt or by a wood screws 78c from the inside. Upper bolts 78d and 78e each secure an associated longitudinally-extending protective rail 73, 74 to stile 71. As noted above, each lower bolt 78c secures an associated striker plate 81 to an associated stile 71, to meet bolts 32a previously described.

As also seen in FIG. 6, the mattress support platform, including the plywood and cross-pieces, 60 is formed of a plurality of pieces of suitable support material 61a, e.g., plywood or particle board; for example, the plywood is cut in sections 61a for assembly. The intermediate transverse pieces 33 are also shown as supporting mattress-support platforms 61a.

Figure 9:
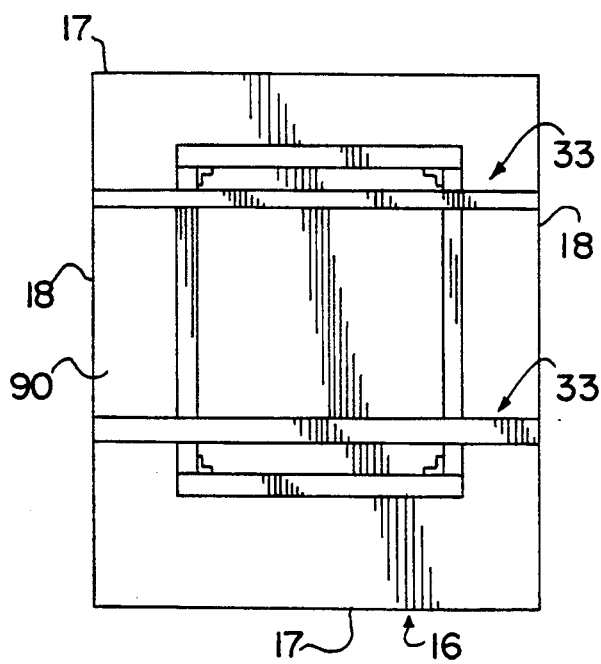
FIG. 9 is a top plan view showing a further modification of the lower bunk to be used as a waterbed.

(v) Description of FIG. 9

In addition, as shown in FIG. 9, the lower bunk 16 could easily become a waterbed by adding a rectangular support 90 adapted to rest on the floor, and also supporting central transverse frame pieces 33 of the lower bunk 16. In addition, the bunk bed could also become two beds by having bed legs formed in two sections, held together by a few metal pins.

When assembled, the bunk bed 10, which may be of a single bed size, double bed size, queen-size or king-size bed size, is of rigid form. The mattresses (which are not shown) rest on the mattress support platforms 60. In addition, the lower bunk 16 may be a wider bunk than upper bunk 13. The lower bunk 16 may be of either king, queen or double bed width with the upper bunk 13 being of queen, double, or single bed width, respectively.

In addition, the bunk bed could also become two separate beds, by having bed legs formed in two sections, each being held together by a few metal pins, the assembly of each bed being by means of the novel assembly bracket of an aspect of this invention.

Finally the bunk bed may also be provided with lower pullout drawers (not shown) in a manner similar to a so-called "captain's bed".

Conclusion

From the foregoing description, one skilled in the art can easily ascertain the essential characteristics of this invention, and without departing from the spirit and scope thereof, can make various changes and modifications of the invention to adapt it to various usuages and conditions. Consequently, such changes and modifications are properly, equitably, and "intended" to be, within the full range of equivalence of the following claims.

What I claim is:

1. An improvement in a bunk bed including a head board having a pair of spaced-apart legs and upper and lower transverse frames, a tail board having a pair of spaced-apart legs and upper and lower transverse frames and connecting members comprising a pair of transversely spaced-apart upper and lower longitudinally-extending outer frames having a generally rectangular cross section, the improvement comprising a bunk bed ladder comprising: a pair of spaced-apart upright stiles with a plurality of vertically-spaced-apart steps or rungs therebetween; an upper longitudinally-extending protective rail secured to the inner face of each of said stiles; a lower longitudinally-extending protective rail secured to the inner face of each of said stiles; and a pair or vertically-spaced-apart brackets secured to the inner face of each of said stiles, said brackets each including an upper portion contacting and fixedly-secured to an associated stile, and a lower portion spaced from its associated stile and adapted to be firmly-secured to a longitudinal outer frame member of a bunk bed.

2. The improvement in the bunk bed ladder of claim 1, wherein each of said longitudinally-extending, upper protective rails and longitudinally-extending, lower protective rails is secured by an associated bolt or wood screw to an associated stile.

3. The improvement in the bunk bed of claim 1, wherein each stile is provided with a striker plate associated with each said bracket.

4. The improvement in the bunk bed ladder of claim 1, wherein: each of said longitudinally-extending, upper protective rails and longitudinally-extending, lower protective rails is secured by an associated bolt or wood screw to an associated stile; and wherein each stile is provided with a striker plate associated with each said bracket.

* * * * *